(12) United States Patent
Herzig

(10) Patent No.: US 7,868,116 B2
(45) Date of Patent: Jan. 11, 2011

(54) PROCESS FOR THE PRODUCTION OF HIGH-MOLECULAR-WEIGHT ORGANOPOLYSILOXANES

(75) Inventor: Christian Herzig, Waging (DE)

(73) Assignee: Wacker Chemie AG, Munich (DE)

( * ) Notice: Subject to any disclaimer, the term of this patent is extended or adjusted under 35 U.S.C. 154(b) by 36 days.

(21) Appl. No.: 12/305,112

(22) PCT Filed: Jun. 19, 2007

(86) PCT No.: PCT/EP2007/056058

§ 371 (c)(1),
(2), (4) Date: Dec. 16, 2008

(87) PCT Pub. No.: WO2007/147817

PCT Pub. Date: Dec. 27, 2007

(65) Prior Publication Data

US 2009/0198034 A1 Aug. 6, 2009

(30) Foreign Application Priority Data

Jun. 20, 2006 (DE) .................. 10 2006 028 300

(51) Int. Cl.
*C08G 77/06* (2006.01)
(52) U.S. Cl. ............................. 528/15; 528/17; 528/18

(58) Field of Classification Search .................... 528/15
See application file for complete search history.

(56) References Cited

U.S. PATENT DOCUMENTS

| | | | | |
|---|---|---|---|---|
| 3,639,498 | A | * | 2/1972 | Vlismas ....................... 528/32 |
| 4,322,518 | A | * | 3/1982 | Blizzard ...................... 528/15 |
| 5,516,870 | A | | 5/1996 | Biggs et al. |
| 5,807,956 | A | | 9/1998 | Czech |
| 5,981,681 | A | | 11/1999 | Czech |
| 6,235,834 | B1 | | 5/2001 | Gee et al. |
| 6,759,094 | B2 | * | 7/2004 | Herzig et al. ............... 427/387 |
| 2003/0055194 | A1 | | 3/2003 | Herzig |

FOREIGN PATENT DOCUMENTS

| | | | |
|---|---|---|---|
| EP | 1 069 149 A1 | | 1/2001 |
| EP | 1069149 A1 | * | 1/2001 |
| EP | 1 175 932 A2 | | 1/2002 |
| EP | 1175937 A2 | * | 1/2002 |
| JP | 2001040091 A | | 2/2001 |
| JP | 2003048987 A | | 2/2003 |

* cited by examiner

*Primary Examiner*—Randy Gulakowski
*Assistant Examiner*—Lindsay Nelson
(74) *Attorney, Agent, or Firm*—Brooks Kushman P.C.

(57) ABSTRACT

High-molecular-weight siloxane polymers are prepared in a multi-step process wherein an Si—H functional linear siloxane containing silanol groups is reacted with a hydrosilylatable organic compound, and the product is then condensed.

7 Claims, No Drawings

PROCESS FOR THE PRODUCTION OF HIGH-MOLECULAR-WEIGHT ORGANOPOLYSILOXANES

CROSS-REFERENCE TO RELATED APPLICATION

This application is the U.S. national phase of PCT Appln. No. PCT/EP2007/056058 filed Jun. 19, 2007 which claims priority to German application DE 10 2006 028 300.7 filed Jun. 20, 2006.

BACKGROUND OF THE INVENTION

1. Field of the Invention

The invention relates to a process for the production of organically modified high-molecular-weight siloxane polymers.

2. Description of the Related Art

U.S. Pat. No. 6,759,094 B2 describes organically modified high-molecular-weight siloxane polymers which are synthesized via double hydrosilylation: In a first stage, branched SiH-terminated siloxane polymers are constructed which, in a subsequent reaction with aliphatically unsaturated organic compounds, are functionalized on the SiH ends again via hydrosilylation. Very high-molecular-weight siloxane polymers are obtainable via this reaction cycle, although the average number of organic substituents per molecule is limited by the number of SiH ends of the precursor. In the case of very high functionalization there is a gel risk and the production of high-molecular-weight siloxane polymers with terminal organic substituents is in principle not possible.

U.S. Pat. Nos. 5,981,681 and 5,807,956 also describe the production of high-molecular-weight siloxane polymers which are produced from telechelic diepoxysiloxanes and diaminopolyethers and have a linear block structure. The synthesis requires exclusively difunctional organic components which are usually not readily accessible and are generally expensive. The process is not suitable for producing siloxane polymers which are organically substituted at lateral positions. Commercially available copolymers of dimethylsiloxy and hydrogenmethylsiloxy units are usually methyl-terminated. Although these raw materials are highly suited for the modification with aliphatically unsaturated organic compounds, the production of high-molecular-weight siloxane polymers is made very much more difficult by the unreactive siloxane backbone after the hydrosilylation step.

SUMMARY OF THE INVENTION

The invention provides a process for the production of high-molecular-weight siloxane polymers, wherein a two stage synthesis beginning by reacting a linear Si—H containing siloxane diol with an unsaturated compound is followed by condensation of the resultant product to form a high-molecular-weight polymer.

DETAILED DESCRIPTION OF THE PREFERRED EMBODIMENTS

Thus, in a first stage an OH-terminated substantially linear siloxane (1) of the general formula $$HO(R_2SiO)_m(HRSiO)_nH \quad (I)$$

is reacted with an organic compound (2) of the formula $$C_fH_{2f-2k-1}-Z \quad (II)$$

selected from the group of
$H_2C=CR^3-Z$ (2a), if k=0 and
$R^4C\equiv C-Z$ (2b), if k=1, where
R may be identical or different and is a monovalent optionally substituted hydrocarbon radical free from terminal aliphatic carbon-carbon multiple bonds,
$R^3$ and $R^4$, in each case independently of one another, are hydrogen or an alkyl radical having 1 to 20 carbon atoms,
m is 0 or an integer from 1 to 1000, preferably 0 or an integer from 1 to 300, more preferably an integer from 20 to 200,
n is an integer from 1 to 200, preferably an integer from 1 to 50, more preferably an integer from 3 to 30, with the proviso that the m+n units can be randomly distributed in the molecule,
Z is a monovalent hydrocarbon radical free from terminal aliphatic carbon-carbon multiple bonds which can contain one or more heteroatoms selected from the group of oxygen, nitrogen, boron, silicon and titanium,
or is a monovalent polymer radical having more than 20 carbon atoms,
f is an integer from 2 to 22, preferably 2, and
k is 0 or 1, and in a second stage the siloxanediols (3) obtained in the first stage and of the general formula $$HO(R_2SiO)_m((Z-C_fH_{2f-2k})RSiO)_{n-o}(HRSiO)_oH \quad (III)$$

where o is 0 or an integer from 1 to 10, preferably 0 or an integer from 1 to 3, and o<n are condensed.

Radical R are preferably monovalent hydrocarbon radicals having 1 to 18 carbon atoms which are free from terminal aliphatic carbon-carbon multiple bonds and are optionally substituted by halogen atoms, amino groups, ether groups, ester groups, epoxy groups, cyano groups or (poly)glycol radicals, more preferably alkyl radicals having 1 to 12 carbon atoms, in particular the methyl radical. Preferably, radical R contains no groups which essentially hinder the hydrosilylation reaction.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as the o-, m-, p-tolyl radicals, xylyl radicals and ethylphenyl radicals; and aralkyl radicals such as the benzyl radical, and the α- and the β-phenylethyl radicals.

Examples of substituted radicals R are the methoxyethyl radical, the ethoxyethyl radical and the ethoxyethoxyethyl radical.

Examples of radicals $R^3$ and $R^4$ are, in each case independently of one another, hydrogen and the alkyl radicals stated for radical R.

Preferably, radicals $R^3$ and $R^4$, in each case independently of one another, are a hydrogen atom.

Examples of siloxanes (1) used according to the invention are condensates of dimethylsiloxy and methyl-hydrogensiloxy units or diethylsiloxy and methyl-hydrogensiloxy units.

Although not stated in formula (I), up to 3 mol % of the m diorganosiloxy units and/or n hydrogenorganosiloxy units can be replaced by other siloxy units, such as $RSiO_{3/2}$ and $SiO_{4/2}$ units, where R has the meaning given above, but content of such siloxy units of less than 1 mol % is preferred. It likewise lies within the scope of the invention that, in formula (I), small amounts of the end groups having OH groups may be replaced by $R_3SiO$ groups, which technically should not be ruled out, but is not preferred. Preferably, the mol ratio of the sum of $(HO)R_2SiO$ and $HRSiO(OH)$ units to $R_3SiO$ groups is greater than 2, more preferably greater than 20.

The siloxanes (1) used according to the invention preferably have a viscosity of 10 to 10,000 mPas, more preferably from 20 to 2000 mPas, in each case at 25° C.

Siloxanes (1) are known and can be prepared by methods customary in silicon chemistry.

The organic compounds (2) contain aliphatic C—C double or triple bonds which are reactive toward Si—H groups in hydrosilylation reactions and add to these to form Si—C bonds.

If k=0, component (2) contains a double bond (2a).

If k=1, component (2) contains a triple bond (2b).

The addition of the SiH group in compound (1) to the double or triple bond in (2a) or (2b) results in the formation, known to the person skilled in the art, of isomers as follows:

$$H_2C=CR^3-Z+-Si-H \rightarrow -Si-CH_2-CHR^3-Z \quad (iii)$$

$$H_2C=CR^3-Z+-Si-H \rightarrow H_3C-C(-Si)R^3-Z \quad (iv)$$

$$R^4C\equiv C-Z+-Si-H \rightarrow -Si-CR^4=CH-Z \quad (v) \text{ and}$$

$$R^4C\equiv C-Z+-Si-H \rightarrow R^4HC=C(-Si)-Z \quad (vi),$$

where $R^3$ and $R^4$ have one of the meanings given above.

The $-C_fH_{2f-2k}$ group in the organosiloxane produced according to the invention in the first stage comprises this isomer formation and is therefore preferably the isomeric radicals $-CH_2-CHR^3-$ from (iii) and $H_3C-CR^3-$ from (iv) and $-CR^4=CH-$ from (v) and $R^4HC=C-$ from (vi)

and f is therefore the total number of carbon atoms in the $H_2C=CR^3$ group of (2a) or of the $R^4C\equiv C$ group of (2b), where $R^3$ and $R^4$ have one of the meanings given above.

Since $R^3$ and $R^4$ are preferably hydrogen atoms, f is therefore preferably 2.

Examples of the $H_2C=CR^3$ group in the organic compound (2a) are $H_2C=CH-$,
$H_2C=C(CH_3)-$,
$H_2C=C(C_4H_9)-$ and
$H_2C=C(C_8H_{17})-$.

Examples of the $R^4C\equiv C$ group in the organic compound (2b) are $HC\equiv C-$,
$CH_3C\equiv C-$ and
$C_4H_9C\equiv C-$.

Apart from carbon and hydrogen atoms, the radical Z bonded to the double or triple bond in (2a) or (2b) can also contain one or more heteroatoms selected from the group of oxygen, nitrogen, boron, silicon and titanium and is not reactive toward SiH groups in a hydrosilylation reaction.

The unsaturated compound (2) used according to the invention can thus contain functional groups, such as hydroxy, ether, ester, amido, urethane, urea, amino, oximo, imino, carboxyl, carbonyl or epoxy groups. Preferably, it contains no groups which essentially hinder the hydrosilylation reaction.

Examples of radicals Z are
—$(CH_2)_5CH_3$,
—$(CH_2)_9CH_3$,
—$(CH_2)_{15}CH_3$,
—$C(CH_3)_2OH$,
—$(CH_2)_4OH$,
—$OC_4H_9$,
—$O_2CCH_3$,
—$CO_2CH_3$,
—$(CH_2)_8CO_2C_3H_7$,
—$(CH_2)_8CON(C_2H_5)_2$,
—$CH_2O_2CNHC_{18}H_{37}$,
—$CH_2NHCONHC_{18}H_{37}$,
—$CH_2NH_2$,
—$(CH_2)_8CO_2H$,
—$CO_2H$,
—$COCH_3$ and

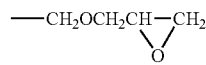

Preferably, the organic compound (2) used according to the invention consists of carbon atoms, hydrogen atoms, optionally oxygen atoms and optionally nitrogen atoms, with those which consist of carbon atoms, hydrogen atoms and optionally oxygen atoms being particularly preferred.

The organic compounds (2) are standard commercial products and/or can be produced by methods customary in chemistry.

Compound (2) is used in an amount such that the molar ratio of the radicals having aliphatic carbon-carbon multiple bond to SiH groups of component (1) is preferably between 0.5 and 5, more preferably between 1.0 and 3.0, and in particular between 1.0 and 1.8.

The first stage of the process according to the invention is preferably carried out under an inert gas atmosphere, such as, for example, nitrogen, but where the presence of small amounts of oxygen, for example up to ca. 10,000 ppm by volume, can have a reaction-accelerating effect.

The catalysts (7) promoting the addition of Si-bonded hydrogen onto aliphatic multiple bond that can be used in the process according to the invention are also the same catalysts which have hitherto also been used for promoting the addition of Si-bonded hydrogen onto aliphatic multiple bond. The catalysts are preferably a metal from the group of platinum metals or a compound or a complex from the group of platinum metals. Examples of such catalysts are metallic and finely divided platinum which may be on supports, such as silicon dioxide, aluminum oxide or activated carbon, compounds or complexes of platinum such as platinum halides, e.g. $PtCl_4$, $H_2PtCl_6 \cdot 6H_2O$, $Na_2PtCl_4 \cdot 4H_2O$, platinum-olefin complexes, platinum-alcohol complexes, platinum-alcoholate complexes, platinum-ether complexes, platinum-aldehyde complexes, platinum-ketone complexes, including reaction products from $H_2PtCl_6 \cdot 6H_2O$ and cyclohexanone, platinum-vinyl siloxane complexes, such as platinum-1,3-divinyl-1,1,3,3-tetramethyldisiloxane complexes with or without content of detectable inorganically bonded halogen, bis(γ-picolene)-platinum dichloride, trimethyldipyridine-platinum dichloride, dicyclopentadieneplatinum dichloride, dimethylsulfoxideethyleneplatinum(II) dichloride, cyclooctadieneplatinum dichloride, norbornadieneplatinum dichloride, γ-picoleneplatinum dichloride, cyclo-pentadieneplatinum dichloride, and reaction products of platinum tetrachloride with olefin and primary amine or secondary amine or primary and secondary amine, such as the reaction product of platinum tetrachloride dissolved in 1-octene with sec-butylamine or ammonium-platinum complexes.

The catalyst (7) is used in the first process step preferably in amounts of from 0.2 to 20 ppm by weight (parts by weight per million parts by weight), more preferably in amounts of from 1 to 10 ppm by weight, in each case calculated as elemental platinum and based on the total weight of siloxane (1) and compound (2).

The first process step is preferably carried out at the pressure of the ambient atmosphere, i.e. about 900 to 1100 hPa, although it can also be carried out at higher or lower pressures. Furthermore, the first process step is preferably carried out at a temperature of from 20° C. to 150° C., preferably 40° C. to 100° C.

If desired, in the first process step, free-radical initiators, such as 4-methoxyphenol, 2,6-bis(tert-butyl)-4-methylphenol, phenothiazine, hydroquinone or pyrocatechin can also be used. The free-radical inhibitors are used here preferably in amounts of from 10 to 500 ppm by weight, based on the total weight of compounds (1) and (2).

In the first process step, organic solvents can be co-used which are preferably inert toward the reaction of compound (1) with compound (2). Examples of inert, organic solvents are toluene, xylene, octaneisomers, heptaneisomers, butyl acetate, 1,2-dimethoxyethane, tetrahydrofuran and cyclohexane.

The optionally co-used inert organic solvents can be removed after the first and/or second process step by distillation, or can remain in the reaction mixture.

The first stage of the process according to the invention is preferably carried out under an inert gas atmosphere, such as, for example, nitrogen, but where the presence of small amounts of oxygen, for example up to ca. 10 000 ppm by volume, can have a reaction-accelerating effect.

The condensing of the compound (3) obtained in the first stage in accordance with the second stage of the process according to the invention leads to the increase in the molecular weight and can be carried out in the presence or absence of condensation accelerators (6).

Condensation accelerators (6) which can be used are all components which have hitherto also been used in condensation reactions. Examples of condensation accelerators (6) are aluminum compounds, bismuth compounds, zinc compounds and titanium compounds and organic tin compounds, such as di-n-butyltin dilaurate and di-n-butyltin diacetate, di-n-butyltin oxide, dioctyltin diacetate, dioctyltin dilaurate, dioctyltin oxide, and also reaction products of these compounds with alkoxysilanes, such as tetraethoxysilane, acids, such as toluenesulfonic acids and perfluorocarboxylic acids, where titanium compounds and acids are preferred, and sulfonic acids and activated carboxylic acids are particularly preferred.

If, in the second stage of the process according to the invention, condensation accelerators (6) are used, the amounts are preferably 0.01 to 3 parts by weight, more preferably 0.05 to 2 parts by weight, in each case based on 100 parts by weight of compound (3).

The condensation according to the invention can take place with or without the addition of further SiOH-functional compounds (variant a) with release of water, and/or by adding silicon compounds which contain at least two hydrolyzable groups per molecule which condense with the silanol groups of compound (3) (variant b).

The SiOH-functional compounds (5) which can be used in the second step of the process according to the invention are any desired SiOH-functional organosilicon compounds known hitherto. Examples of compounds (5) are siloxanes of formula (I) where n is 0, such as, for example, commercially available polydimethylsiloxanes with terminal silanol groups.

If, in the second step of the process according to the invention, compounds (5) are used, the amounts are preferably from 10 to 500 parts by weight, particularly preferably 50 to 300 parts by weight, in each case based on 100 parts by weight of compound (3).

The optionally used compounds (4) are more preferably silanes of the general formula

$$A_a R^1{}_b Si(OR^2)_{4-a-b} \qquad (IV)$$

where

A each is identical or different and is a monovalent radical of the formula —CR$^5{}_2$—Y, R$^5$ each is identical or different and is a hydrogen atom or an alkyl radical, Y each is a monofunctional heteroatom from the group of halogens, of monosubstituted atoms O and S and of substituted atoms N and P, R$^1$ each is identical or different and is a monovalent, optionally substituted hydrocarbon radical, R$^2$ each is identical or different and is an alkyl radical, a is 0, 1 or 2, preferably 1, b is 0, 1 or 2, preferably 1, with the proviso that a+b is ≦2.

Preference is in turn given to the use of alkoxysilanes (4) which, for the condensation with compounds (3), also require small amounts of effective catalysts, but, compared to the acyl- or halogensilanes, produce neutral cleavage products.

Examples of radicals R$^1$ are the examples given above for radical R. The radicals R$^1$ are preferably optionally substituted hydrocarbon radicals having 1 to 18 carbon atoms, where the methyl radical and the ethyl radical are particularly preferred.

The use of silanes of formula (IV) with a radical A is especially preferred since condensations with compound (3) in most cases proceed without additional catalysis even at 25° C. Here, reaction times of from a few minutes to several hours are achieved. The cleavage alcohols which are formed can be left in the reaction mixture or can be removed in vacuo.

Examples of radical R$^1$ are the examples given above for radical R.

Examples of radicals R$^2$ are the examples given above for radical R. Preferably, radicals R$^2$ are alkyl radicals having 1 to 8 carbon atoms, where alkyl radicals having 1 or 2 carbon atoms are particularly preferred.

Preferably, R$^2$ is alkyl radicals having 1 to 8 carbon atoms, where alkyl radicals having 1 or 2 carbon atoms are particularly preferred.

Examples of radicals R$^5$ are hydrogen and the examples given above for radical R. Preferably, radicals R$^5$ are alkyl radicals having 1 to 4 carbon atoms, where hydrogen is particularly preferred.

Examples of radicals Y are fluorine, chlorine, bromine or iodine, the groups —OH or —OR$^6$, the groups —SH or —SR$^6$, the groups —NH$_2$, —NHR$^6$ or —NR$^6{}_2$ and the groups —PR$^6{}_2$, —P(OR$^6$)$_2$, and —PO(OR$^6$)$_2$, where $R^6$ is a monovalent organic radical optionally containing N and/or O atoms, preferably a monovalent hydrocarbon radical having 1 to 18 carbon atoms and optionally containing N and/or O atoms.

Examples of radicals A are hydroxymethyl, methoxymethyl, ethoxymethyl, 2-ethoxyethoxymethyl, 2-butoxyethoxymethyl, acetoxymethyl, mercaptomethyl, ethylthiomethyl, dodecylthiomethyl, aminomethyl, methylaminomethyl, dimethylaminomethyl, diethylaminomethyl, dibutylaminomethyl, cyclohexylaminomethyl, anilinomethyl, 3-dimethylaminopropylaminomethyl, bis(3-dimethylaminopropyl)aminomethyl, diethylphosphinomethyl and dibutylphosphinomethyl radical, and groups of the formulae —$CH_2NHCOR^6$, —$CH_2NHCO_2R^6$ or —$CH_2NHCONHR^6$, where $R^6$ has the meaning given for it above.

Preferably, A is a radical of the formula —$CH_2NHR^6$ or —$CH_2NR^6{}_2$, where $R^6$ has the meaning given for it above.

Examples of optionally used silanes (4) are 2-butoxyethoxymethyltrimethoxysilane, methoxymethylmethyldiethoxysilane, diethylaminomethylmethyldimethoxysilane, dibutylaminomethyltriethoxysilane, dibutylaminomethyltributoxysilane, cyclohexylaminomethyltrimethoxysilane, cyclohexylaminomethyltriethoxysilane, cyclohexylaminomethylmethyldiethoxysilane, anilinomethyltriethoxysilane, 3-dimethylaminopropylaminomethyltrimethoxysilane, acetylaminomethylmethyldimethoxysilane, ethylcarbamoylmethyltrimethoxysilane, ethylcarbamoylmethylmethyldimethoxysilane, diisopropylaminocarbamoylmethylmethyldimethoxysilane and imidazolylcarbamoylmethylmethyldimethoxysilane.

The compounds (4) are standard commercial products and/or can be produced by methods customary in silicon chemistry.

If in the second step of the process according to the invention, silicon compound (4) are used, the amounts are from preferably 0.01 to 10 parts by weight, more preferably 0.1 to 2.0 parts by weight, in each case based on 100 parts by weight of compound (3).

The second process step is preferably carried out at the pressure of the ambient atmosphere, i.e. about 900 to 1100 hPa, although it can also be carried out at higher or lower pressures. In addition, the second process step is preferably carried out at a temperature of from 10 to 120° C., more preferably 25 to 80° C.

The second stage of the process according to the invention is preferably carried out under inert gas atmosphere, such as, for example, under nitrogen.

On account of the sometimes high viscosities of the condensation products of siloxanediols (3) and optional condensation partners (4), it may be advantageous, for reasons of handling, to use diluents, such as, for example, organic solvents, as can be used, for example in the first process step, or siloxanes, such as, for example, cyclosiloxanes or short-chain linear or branched organosiloxanes or dimethylglycolsiloxanes, in the second step of the process according to the invention.

The components used in the process according to the invention may in each case be one type of such a component, or else a mixture of at least two types of a particular component.

The process according to the invention can be carried out discontinuously, continuously, or semicontinuously, preference being given to a discontinuous procedure.

The polymers prepared by the process according to the invention can then be further processed directly or isolated according to any desired methods known hitherto, such as, for example, by removing any co-used diluents.

In the process according to the invention, organically modified high-molecular-weight siloxane polymers are obtained which contain covalently bonded, preferably via SiOSi, segments of the formula

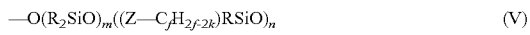
$$—O(R_2SiO)_m((Z—C_fH_{2f-2k})RSiO)_n \quad (V)$$

where R, Z, m, f, k and n have the meanings given for them above.

Depending on the structure of the optionally used compounds (4) and/or (5), either linear (e.g. in the case of silane of the formula (IV) where a+b=2) or branched to dendrimer-like (e.g. in the case of silane of the formula (IV) where a+b<2) siloxane polymers are obtained.

The viscosity of these siloxane polymers produced according to the invention is preferably at least 5000 mPa·s, more preferably at least 20,000 mPa·s, and in particular at least 50,000 mPa·s, in each case at 25° C. As a result of the condensation step of the second stage, it is possible to obtain viscosities of more than 1 million mPa·s without problems.

The siloxane polymers produced according to the invention are preferably highly viscous liquids. When using a silane of the formula (IV) where a+b<2, in the case of a suitable stoichiometry, thus when the molar ratio of SiOH in the siloxanediol (3) to $SiOR^2$ in compound (4) is approximately equal, elastomer-like solids can also be obtained. A particular embodiment of the process according to the invention consists in generating such elastomer gels through co-use of a suitable diluent, such as dimethylglycolsiloxanes, in the swollen state, and therefore being able to convey the product by means of pumps, screws or similar media.

The polymers prepared according to the invention can now be used for all purposes for which organopolysiloxanes have also hitherto been used.

The process according to the invention has the advantage that it is simple to carry out and produces high yields of polymers.

The process according to the invention has the advantage that the synthesis of organically modified high-molecular-weight siloxane polymers is made possible in which the organomodification, on account of the good accessibility of olefinically or acetylenically unsaturated organic precursors, takes place via hydrosilylation and the molecular weight increase can be easily and reliably controlled.

The process according to the invention is particularly attractive if high-molecular-weight siloxane polymers are to be produced which are produced from hydrosilylation raw materials which are not very miscible or even immiscible with one another. In such cases, it is advantageous to use low-molecular-weight siloxanes (1) and only after hydrosilylation has taken place, to convert these to high polymers since the reaction of compounds (2) with high-molecular-weight H-siloxanes requires, on account of yet poorer miscibility, long times, large amounts of catalyst and sometimes also high temperatures, or else no adequate conversion can be achieved.

In the examples below, all of the data relating to parts and percentages is based, unless stated otherwise, on the weight. Unless stated otherwise, the examples below are carried out at a pressure of the ambient atmosphere, i.e. at about 1000 hPa, and at room temperature, i.e. about 20° C. or a temperature which is established upon combining the reactants at room temperature without additional heating or cooling. All of the viscosity data listed in the examples supposedly refers to a temperature of 25° C.

In the examples, iodine number is the term used to refer to the number which gives the amount of iodine consumed during the addition to the aliphatic multiple bond, in grams per 100 grams of used material to be investigated.

EXAMPLE 1

83 g of 1-octadecene are mixed with 20 g of a hydrogensiloxane of the formula $HO(Me_2SiO)_{60}(HMeSiO)_{14.3}H$ with a random monomer distribution at 25° C. under a nitrogen atmosphere, and heated to 90° C. The hydrosilylation is started by adding 0.38 g of a 1% strength solution of hexachloroplatinic acid in isopropanol, and, at 100° C., a further 80 g of the same H-siloxane are metered in over a period of 20 minutes. A further 0.19 g of the catalyst solution is metered in. After a total reaction time of 3 hours, an SiH conversion of more than 98% is achieved.

To increase the molecular weight through condensation of the silanol groups with alkoxy-Si groups, 2.0 g of aminoethylaminopropyltrimethoxysilane are added and the total mixture is held for a further one hour at 100° C. The viscosity increases very considerably until the reaction mixture is scarcely still stirrable. Upon cooling, the product solidifies with a melting point of ca. 42° C. It dissolves in three times the amount of toluene to give a clear solution and thus does not form a gel. The average siloxane polymer comprises ca. 90 octadecyl groups.

EXAMPLE 2

32.7 g of 2-methyl-3-buten-2-ol are heated with 0.32 g of the Pt catalyst used in example 1 to 90° C. under the nitrogen atmosphere. A total of 120 g of the H siloxane of the formula $HO(Me_2SiO)_{60}(HMeSiO)_{14.3}H$ are metered in and the internal temperature is kept at ca. 100° C. After one hour, SiH can no longer be detected in the IR spectrum, which corresponds to a conversion well in excess of 99%. Excess carbinol is removed in vacuo, giving a polycarbinolsiloxane with a viscosity of 14,300 mPa·s and a molecular weight of Mn=6600.
  a) 66 g of the polycarbinolsiloxane are admixed at 25° C. with 1.9 g of diethylaminomethylmethyldimethoxysilane and thoroughly homogenized. Within a few minutes, the viscosity starts to increase considerably, which ultimately leads to a rigid, elastomer-like mass. After 24 hours at 25° C., a sample is dispersed in a 10-fold amount of isopropanol. After three days, a clear, highly viscous solution is obtained: the highly condensed polycarbinolsiloxane is soluble in isopropanol completely and without residue. $^{29}$Si-NMR reveals the molar ratio of —Me$_2$SiOH/MeSi(CH$_2$N)O using the corresponding integrals to be 1:7.6. An average siloxane polymer accordingly comprises 15.2 α-aminosiloxane monomers: thus, on average 16.2 polycarbinolsiloxane chains are condensed, giving an average number of 232 tert-carbinol groups for a total length of around 1200 siloxy units.
  b) Without addition of alkoxysilane, 50 g of the polycarbinolsiloxane are mixed with 50 g of Me-siloxane of the formula $HO(Me_2SiO)_{48}H$. The initially cloudy mixture is clear at 100° C. after adding 30 g of toluene. 0.25 g of toluenesulfonic acid solution (20% strength in THF) are added, then the mixture is heated to ca. 125° C., whereupon a considerable increase in the viscosity becomes visible. In order to ensure the stirrability, a further 30 g of toluene are added and the mixture is held at reflux for a further two hours. After initial drying, the viscous solution produces a tacky, colorless film which is completely clear. The originally immiscible condensation starting materials are condensed under acidic catalysis to give a linear polymer. It contains carbinol-containing and carbinol-free block segments. $^{29}$Si-NMR gave no indications as to the formation of cyclosiloxanes, which rules out equilibrating experimental conditions.

EXAMPLE 3

800 g of allyl alcohol polyethoxylate with an iodine number of 49.0 are turbomixed with 401 g of the hydrogensiloxane from example 1 and heated to 87° C. under a nitrogen atmosphere. In succession, 0.36 g of cyclohexene oxide and 1.25 g of a 1% strength solution of hexachloroplatinic acid in isopropanol are metered in. With an exothermic reaction, the mixture becomes clear after 12 minutes. After one hour, at ca. 100° C., the same amount of Pt catalyst is again metered in, after which the mixture is kept at the same temperature for a further two hours. IR analysis on the remaining SiH reveals a conversion of more than 99%. The mixture has a viscosity of 4470 mm²/s at 25° C.

Using anilinomethylmethyldiethoxysilane, two condensation experiments are carried out at 25° C.
  a) Addition of 0.50% silane and homogeneous distribution produces after one day a clear highly viscous polyether siloxane polymer with 21 Pa·s (25° C.), which dissolves in the same amount of water to give a clear solution.
  b) Addition of 1.5% silane and rapid, homogeneous distribution results after a few minutes in a rigid, elastomer-like mass which dissolves in water to give a clear solution. The SiCH$_2$CH$_2$—/SiOH integral ratio of 137:1 gives a content of, on average, 274 polyether chains per siloxane chain.

The invention claimed is:

1. A process for the production of high-molecular-weight siloxane polymers, comprising:
  in a first stage, reacting an OH-terminated substantially linear siloxane (1) of the formula $$HO(R_2SiO)_m(HRSiO)_nH \quad \text{(I)}$$

with an organic compound (2) of the formula $$C_fH_{2f-2k-1}—Z \quad \text{(II)}$$

selected from the group of
  $H_2C=CR^3—Z$ (2a), when k=0 and
  $R^4C\equiv C—Z$ (2b), when k=1,
  where
    R each is identical or different and is a monovalent optionally substituted hydrocarbon radical free from terminal aliphatic carbon-carbon multiple bonds,
    $R^3$ and $R^4$, in each case independently of one another, are hydrogen or an alkyl radical having 1 to 20 carbon atoms,
    m is 0 or an integer from 1 to 1000,
    n is an integer from 1 to 200, the m+n units optionally randomly distributed in the molecule,
    Z is a monovalent hydrocarbon radical free from terminal aliphatic carbon-carbon multiple bonds which optionally contains one or more heteroatoms selected from the group consisting of oxygen, nitrogen, boron, silicon and titanium, or is a monovalent polymer radical having more than 20 carbon atoms,
    f is an integer from 2 to 22 and
    k is 0 or 1,
  and in a second stage, condensing the siloxanediols (3) obtained in the first stage and of the general formula $$HO(R_2SiO)_m((Z—C_fH_{2f-2k})RSiO)_{n-o}(HRSiO)_oH \quad \text{(III)}$$

where o is 0 or an integer from 1 to 10, and is less than n.

2. The process of claim 1, wherein the organic compound (2) used consists of carbon atoms, hydrogen atoms, optionally oxygen atoms and optionally nitrogen atoms.

3. The process of claim 1, wherein compound (2) is used in an amount such that the molar ratio of radicals having aliphatic carbon-carbon multiple bonds to SiH groups of component (1) is between 0.5 and 5.

4. The process of claim 1, wherein the condensation takes place by adding silicon compounds (4) which contain at least two hydrolyzable groups per molecule which condense with the silanol groups of compound (3).

5. The process of claim 4, wherein the silicon compounds which contain at least two hydrolyzable groups per molecule are silanes of the formula $$A_a R^1_b Si(OR^2)_{4-a-b} \qquad (IV)$$

where
- A each is identical or different and is a monovalent radical of the formula —$CR^5_2$—Y,
- $R^5$ each is identical or different and is hydrogen or an alkyl radical,
- Y each is an identical or different monofunctional heteroatom selected from the group of halogens, monosubstituted atoms O and S, and substituted atoms N and P,
- $R^1$ each is identical or different and is a monovalent, optionally substituted hydrocarbon radical,
- $R^2$ each is identical or different and is an alkyl radical,
- a is 0, 1 or 2,
- b is 0, 1 or 2, with the proviso that a+b is $\leq 2$.

6. The process of claim 4, wherein silicon compounds (4) are used in amounts of from 0.01 to 10 parts by weight, based on 100 parts by weight of compound (3).

7. The process of claim 5, wherein silicon compounds (4) are used in amounts of from 0.01 to 10 parts by weight, based on 100 parts by weight of compound (3).

* * * * *